WILLIAM H. THORNE.
Improvement in Portable Drilling-Machines.
No. 114,229. Patented April 25, 1871.
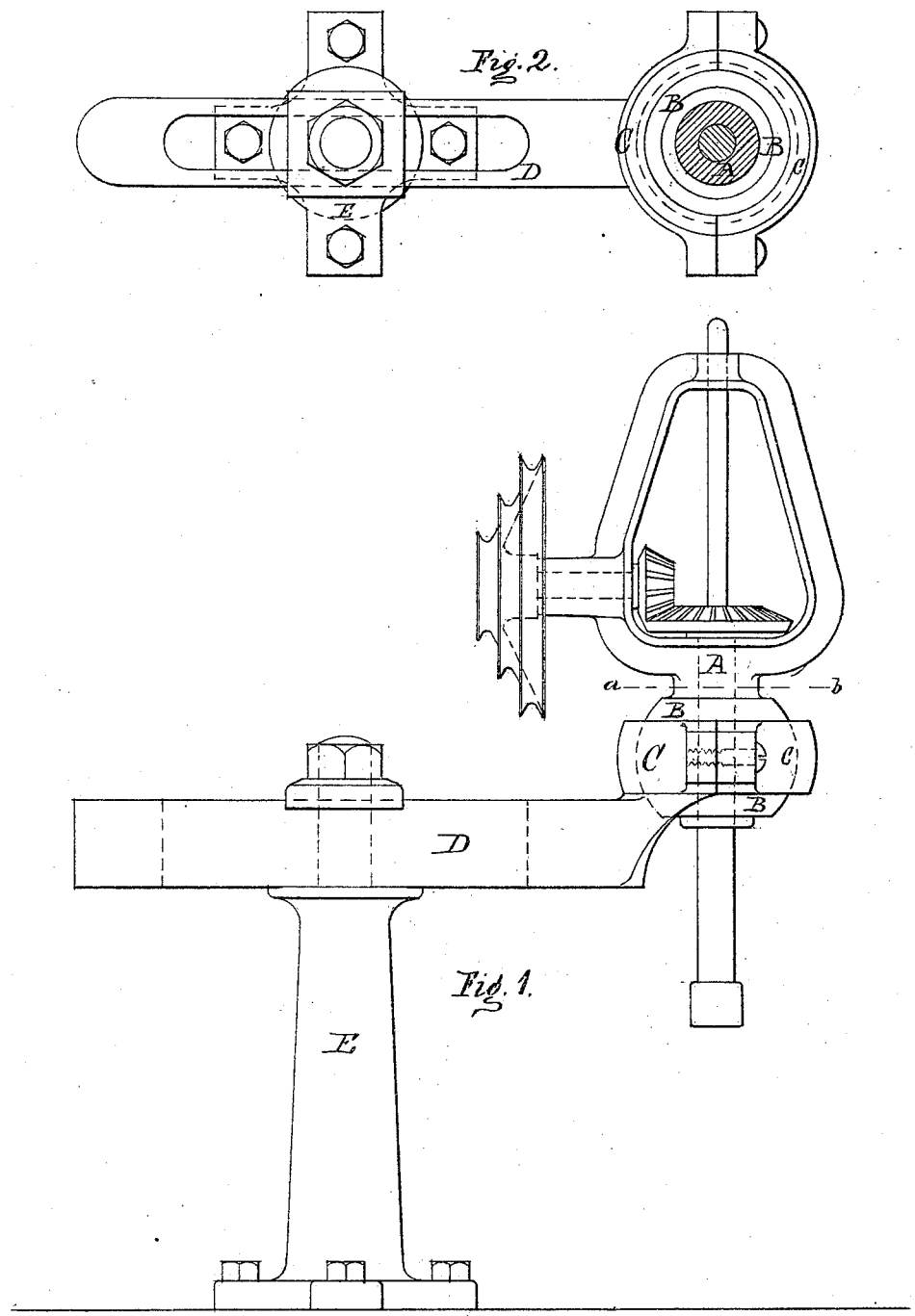

UNITED STATES PATENT OFFICE.

WILLIAM H. THORNE, OF PHILADELPHIA, PENNSYLVANIA, ASSIGNOR TO THORNE & DE HAVEN, OF SAME PLACE.

IMPROVEMENT IN PORTABLE DRILLING-MACHINES.

Specification forming part of Letters Patent No. 114,229, dated April 25, 1871.

I, WILLIAM H. THORNE, of the city and county of Philadelphia, in the State of Pennsylvania, have invented certain Improvements in Portable Drilling-Machines, of which the following is a specification:

Nature and Objects of the Invention.

This invention relates to portable machines for drilling metals.

It consists in the combination of a frame having a ball-shaped journal with a socket-clamp drill-spindle and supporting bracket or table, by which means the drill-spindle can be vibrated in any plane, and at the same time rotated so as to bring the driving-pulley in line with the pulley on the counter-hanger.

The object of this invention is to enable the drill to be used at an angle with the supporting device.

Description of the Accompanying Drawing.

Figure 1 is a side elevation. Fig. 2 is a plan, showing the parts below the line $a\,b$.

General Description.

A is a frame, carrying the drill-spindle, gears, and driving-pulley. B is a ball-shaped journal on the frame A, being a portion of a sphere, whose center is on the axis of the drill-spindle. C $c$ is a clamp, shaped to conform with the journal B, but narrow enough to permit the frame A to be vibrated. D is a radial slotted arm, carrying the clamp C $c$. E is a post, carrying the radial arm D.

When the clamp C $c$ is loosened the operator can adjust the drill to any angle with the supporting device, (limited only by the width of the clamp,) and can rotate the frame A so as to bring the driving-pulley on any side without altering this angle. When the desired position is attained, by tightening the clamp C $c$ the frame A is held rigidly to the radial slotted arm D or other supporting device.

I claim as my invention—

The frame A, having the ball-shaped journal B, in combination with the socket-clamp C $c$, the drill-spindle, and the supporting bracket or table, substantially as and for the purposes specified.

WM. H. THORNE.

Witnesses:
    FREDK. B. MILES,
    O. C. FERRIS.